(12) United States Patent
Kitamura

(10) Patent No.: US 7,573,622 B2
(45) Date of Patent: Aug. 11, 2009

(54) COMPUTER HOLOGRAM AND CREATION METHOD THEREOF

(75) Inventor: Mitsuru Kitamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 259 days.

(21) Appl. No.: 10/586,705

(22) PCT Filed: Jan. 25, 2005

(86) PCT No.: PCT/JP2005/001301

§ 371 (c)(1),
(2), (4) Date: Jul. 20, 2006

(87) PCT Pub. No.: WO2005/073816

PCT Pub. Date: Aug. 11, 2005

(65) Prior Publication Data

US 2008/0225359 A1 Sep. 18, 2008

(30) Foreign Application Priority Data

Feb. 2, 2004 (JP) ............................. 2004-025009

(51) Int. Cl.
*G03H 1/08* (2006.01)
(52) U.S. Cl. .......................................................... 359/9
(58) Field of Classification Search ................... 359/9; 430/1, 2
See application file for complete search history.

(56) References Cited

U.S. PATENT DOCUMENTS 6,618,190 B2 9/2003 Kitamura et al.
6,934,074 B2 8/2005 Kitamura et al.
2002/0027702 A1* 3/2002 Kitamura et al. ............ 359/276

FOREIGN PATENT DOCUMENTS

| JP | 2000-214750 | 8/2000 |
|---|---|---|
| JP | 2002-72837 | 3/2002 |
| JP | 2002-72838 | 3/2002 |

* cited by examiner

*Primary Examiner*—Alessandro Amari
(74) *Attorney, Agent, or Firm*—Ladas and Parry LLP

(57) ABSTRACT

An original image (10), a recording surface (20), and a reference light (R) are defined and a large number of calculation points (Q(x, y)) are defined at a predetermined pitch on the recording surface (20). For each of the calculation points, intensity of interference wave, formed by an object light (O1 to ON) generated from the respective parts (P1 to PN) of the original image (10) and a reference light (R), is calculated. A binary pattern defined by dividing a unit area into a first area having a pixel value "white" and a second area having a pixel value "black" is defined in a plurality of ways by changing the occupancy ratio (0 to 100%) of the first area. A binary pattern having the occupancy ratio corresponding to the interference wave intensity calculated, is assigned to the position of the respective calculation points (Q) on the recording surface (20) so as to form a binary image and create a computer hologram medium having convex and concave portions. By setting the vertical and horizontal pitched of the calculation points (Q) to 400 nm or below, it is possible to reduce the unnecessary noise component generated during observation and obtain a clear reproduction area.

23 Claims, 10 Drawing Sheets

| INTENSITY VALUES AT RESPECTIVE CALCULATION POINTS | | | | | | | | | |
|---|---|---|---|---|---|---|---|---|---|
| 6 | 4 | 3 | 3 | 4 | 6 | 0 | 2 | 0 | 2 |
| 5 | 2 | 0 | 0 | 1 | 5 | 2 | 1 | 2 | 4 |
| 3 | 0 | 2 | 2 | 0 | 3 | 5 | 3 | 4 | 5 |
| 0 | 2 | 4 | 5 | 3 | 2 | 6 | 5 | 6 | 4 |
| 2 | 5 | 6 | 4 | 6 | 1 | 2 | 4 | 3 | 2 |
| 6 | 4 | 2 | 1 | 4 | 3 | 0 | 2 | 1 | 2 |
| 5 | 2 | 0 | 3 | 1 | 4 | 2 | 1 | 3 | 4 |
| 2 | 0 | 2 | 5 | 1 | 2 | 5 | 4 | 5 | 5 |
| 0 | 2 | 4 | 6 | 4 | 0 | 4 | 5 | 6 | 3 |
| 3 | 5 | 5 | 5 | 6 | 2 | 2 | 4 | 4 | 0 |

| BINARIZED INTENSITY VALUES | | | | | | | | | |
|---|---|---|---|---|---|---|---|---|---|
| 1 | 1 | 0 | 0 | 1 | 1 | 0 | 0 | 0 | 0 |
| 1 | 0 | 0 | 0 | 0 | 1 | 0 | 0 | 0 | 1 |
| 0 | 0 | 0 | 0 | 0 | 0 | 1 | 0 | 1 | 1 |
| 0 | 0 | 1 | 1 | 0 | 0 | 1 | 1 | 1 | 1 |
| 0 | 1 | 1 | 1 | 1 | 0 | 0 | 1 | 0 | 0 |
| 1 | 1 | 0 | 0 | 1 | 0 | 0 | 0 | 0 | 0 |
| 1 | 0 | 0 | 0 | 0 | 1 | 0 | 0 | 0 | 1 |
| 0 | 0 | 0 | 1 | 0 | 0 | 1 | 1 | 1 | 1 |
| 0 | 0 | 1 | 1 | 1 | 0 | 1 | 1 | 1 | 0 |
| 0 | 1 | 1 | 1 | 1 | 0 | 0 | 1 | 1 | 0 |

COMPUTER HOLOGRAM AND CREATION METHOD THEREOF

TECHNICAL FIELD

The present invention relates to a hologram creation method, and more particularly, to a creation method of a computer hologram created by forming interference fringes on a predetermined recording surface by a computer-aided operation.

BACKGROUND ART

In recent years, it has become possible to easily obtain a coherent light by use of a laser, and commercial use of holograms has also become considerably widespread. Particularly, for exchange tickets for money and credit cards, from an anticounterfeit standpoint, it has been generalized to create a hologram at a part of the medium.

Currently, most of the commercially used holograms are ones created by recording an original image on a medium as interference fringes by an optical method. That is, in the optical method employed, an object from which an original image is formed is prepared, light from the object and reference light are led onto a recording surface applied with a photosensitive material by use of an optical system such as a lens, and interference fringes are formed on the recording surface. Although this optical method requires an optical system with a considerably high degree of accuracy for obtaining a clear reproduced image, it is the most direct method for obtaining a hologram and is therefore the most industrially widespread method.

On the other hand, a method for creating a hologram by forming interference fringes on a recording surface by a computer-aided operation has also been known. A hologram created by such a method is generally called a "Computer Generated Hologram (CGH)" or simply a "computer hologram." The computer hologram can be obtained by simulating, on a computer, an optical interference fringe generation process, in a manner of speaking, and processes for generating an interference fringe pattern are all carried out as an operation on a computer. After image data on the interference fringe pattern has been obtained by such an operation, physical interference fringes are formed on an actual medium based on the image data. Concretely, for example, the following method has been put into practical use. That is, image data on an interference fringe pattern created by a computer is given to an electron beam drawing apparatus and electron beams are scanned on a medium so as to form physical interference fringes. For example, Japanese Unexamined Patent Publication No. 2000-214750 has disclosed a creation method of a computer hologram that is capable of reproducing an original image with grayscales as faithfully as possible.

As described above, computer holograms are a field for which great demand is expected in the future, however, at this time, there are some problems to be solved in realizing commercial use. One of the great challenges is to enable reproduction of a high-quality grayscale image. A computer hologram created by a conventional method has a problem in that reproduction quality of a grayscale image declines in comparison with an optical hologram.

For example, when the method disclosed in Japanese Unexamined Patent Publication No. 2000-214750 cited above is used, it becomes possible to reproduce an original image with grayscales at a certain level of quality. However, a phenomenon that unnecessary noise components are overlapped is recognized in a reproduced image, and it is undeniable that, in comparison with a hologram created by an optical method, reproduction quality of a grayscale image declines. Particularly, in the lighting environment of the real world where a multiple of light sources exist, a reproduced image is observed in a condition mixed with a large number of noise components, and visibility cannot but decline in comparison with an optical hologram.

It is therefore an object of the present invention to provide a computer hologram that is capable of obtaining a reproduced image as clear as possible by reducing unnecessary noise components generated during observation as much as possible.

DISCLOSURE OF INVENTION (1) According to a first mode of the present invention, in a method for creating a computer hologram by forming interference fringes on a predetermined recording surface by a computer-aided operation, by the steps of:

defining a predetermined original image, a recording surface for recording the original image, and a reference light to be irradiated onto the recording surface;

defining a large number of calculation points on the recording surface, and calculating, in terms of the individual calculation points, intensity of an interference wave formed by an object light emitted from a light source defined on the original image and a reference light;

defining a plurality of types of binary patterns each defined by dividing a unit area having a fixed form and size into a first area having a first pixel value and a second area having a second pixel value by changing an occupancy ratio of the first area relative to the unit area;

allocating, at the position of the respective calculation points, binary patterns having occupancy ratios corresponding to interference wave intensities in terms of the respective calculation points, respectively; and creating physical fringes on a medium based on a binary image formed from an assembly of the binary patterns allocated onto the recording surface;

a pitch of the calculation points defined on the recording surface is set equal to or less than the minimum wavelength of a visible light.

(2) According to a second mode of the present invention, in a method for creating a computer hologram by forming interference fringes on a predetermined recording surface by a computer-aided operation, by the steps of:

defining a predetermined original image and a recording surface for recording the original image;

defining a large number of calculation points on the recording surface, and calculating, in terms of the individual calculation points, intensity and phase of an interference wave formed by an object light emitted from a light source defined on the original image;

defining a plurality of types of binary patterns each defined by dividing a unit area having a fixed form and size into a first area having a first pixel value and a second area having a second pixel value by changing an occupancy ratio of the first area relative to the unit area;

allocating, at the position of the respective calculation points, three-dimensional cells with two-dimensional binary patterns having occupancy ratios corresponding to interference wave intensities in terms of the respective calculation points, respectively, and three-dimensional structures capable of phase modulations corresponding to interference wave phases in terms of the respective calculation points, respectively; and creating a physical hologram recording medium formed from an assembly of the three-dimensional cells allocated onto the recording surface, a pitch of the calculation points defined on the recording surface is set equal to or less than the minimum wavelength of a visible light.

(3) According to a third mode of the present invention, in the creation method of a computer hologram according to the above-described first or second mode, a rectangle is used as the unit area, and the binary pattern is formed by arranging the first area formed of a rectangle having a vertical width equal to a vertical width of the unit area and having a horizontal width according to a predetermined occupancy ratio at an approximately center position with respect to a horizontal width of the unit area and providing a remaining part as the second area.

(4) According to a fourth mode of the present invention, in the creation method of a computer hologram according to the above-described third mode, physical binary patterns are formed by beam scanning using a drawing apparatus with a predetermined resolution, horizontal width sizes of the rectangles forming the first areas of the individual binary patterns are set to be integral multiples of a predetermined unit size L provided in advance within a range where drawing by the drawing apparatus is possible.

(5) According to a fifth mode of the present invention, in the creation method of a computer hologram according to the above-described fourth mode, the horizontal width sizes of the rectangles forming the unit areas are set so as to be n times as great as the unit size L (n is an integer), (n+1) types of binary patterns such as to have the horizontal width sizes of the rectangles forming the first areas 0 times, 1 time, 2 times, . . . n times as great as the unit size are prepared, and these binary patterns are allocated to interference wave intensities sectioned in (n+1) levels in a corresponding manner, respectively, and where a minimum drawing size determined based on drawing resolution of the drawing apparatus is provided as h, a horizontal pitch of the calculation points is set so as to be equal to or less than the minimum wavelength of a visible light and equal to or more than h×n.

(6) According to a sixth mode of the present invention, in the creation method of a computer hologram according to the above-described third to fifth modes, rectangles each having a vertical width equal to a vertical pitch of the calculation points and a horizontal width equal to a horizontal pitch of the calculation points are used as the unit areas, reference points common to all unit areas are provided, the individual binary patterns are allocated so that the respective reference points are arranged on the respective calculation points so that the binary patterns are allocated across the entire surface of the recording surface, and the vertical pitch and horizontal pitch of the calculation points are both set so as to be equal to or less than the minimum wavelength of a visible light.

(7) According to a seventh mode of the present invention, in the creation method of a computer hologram according to the above-described first to sixth modes, the minimum wavelength of a visible light is provided as 400 nm.

(8) According to an eighth mode of the present invention, prepared is a program to make a computer execute processes until a creating step of a binary image in the creation method of a computer hologram according to the above-described first to seventh modes, and the program can be distributed in a manner recorded on a computer-readable recording medium.

(9) According to a ninth mode of the present invention, a computer hologram is created by the creation method of a computer hologram according to the above-described first to seventh forms.

(10) According to a tenth mode of the present invention, in a computer hologram medium for which an original image is recorded on a predetermined medium as interference fringes that form a convex and concave structure, a large number of unit areas are defined on the medium, the respective unit areas on the medium are each divided into a first area and a second area, the first area and the second area have a relationship that one forms a convex portion, and the other, a concave portion, interference wave intensity at the position of each unit area is expressed by an occupancy ratio of the first area relative to the unit area, and the respective unit areas are arrayed at a pitch of equal to or less than 400 nm.

By a creation method of a computer hologram according to the present invention, since an unnecessary noise component generated during observation can be reduced, it becomes possible to obtain a clearer reproduced image.

BEST MODE FOR CARRYING OUT THE INVENTION

Hereinafter, the present invention will be described based on illustrated embodiments.

<<<Section 1. General Hologram Creation Method>>>

Figure 1:
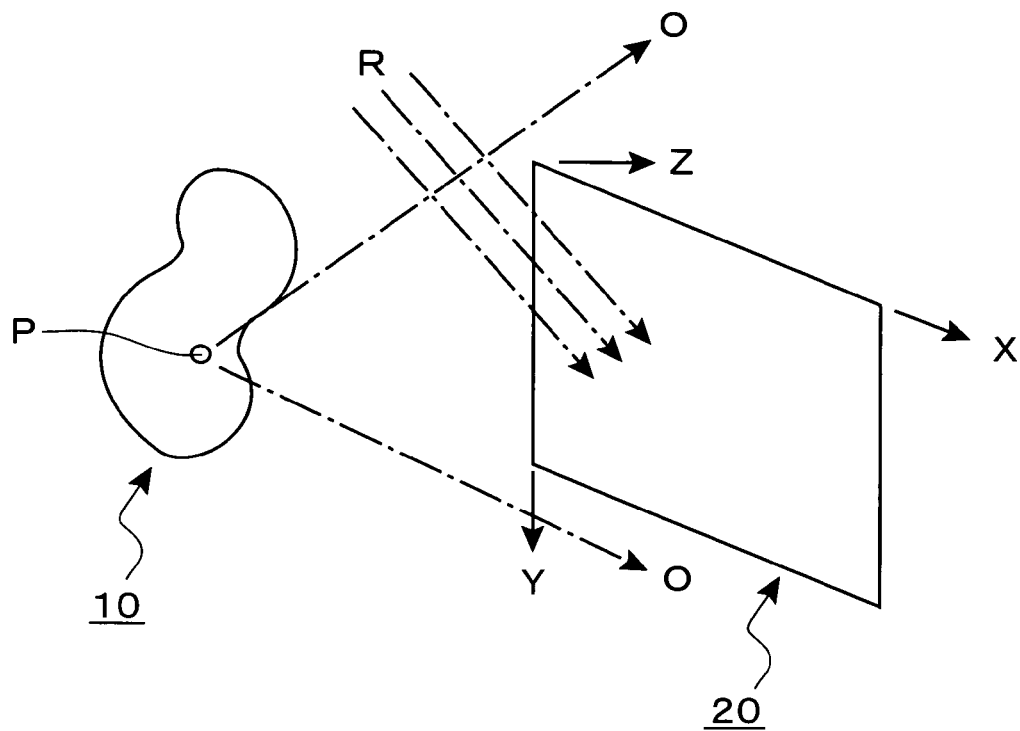
FIG. 1 is a principle diagram showing a general hologram creation method, in which a method for recording an original image 10 on a recording surface 20 as interference fringes is shown.

FIG. 1 is a principle diagram showing a general hologram creation method, in which a method for recording an original image 10 on a recording surface 20 as interference fringes is shown. Here, for convenience of description, an XYZ three-dimensional coordinate system is defined as illustrated, and the recording surface 20 is placed on an XY plane. When an optical method is employed, an object to be a recording target is to be prepared as the original image 10. An object light O emitted from an arbitrary point P on the original image 10 proceeds toward the entire surface of the recording surface 20. On the other hand, a reference light R has been irradiated onto the recording surface 20, and interference fringes of the object light O and reference light R are recorded on the recording surface 20.

Figure 2:
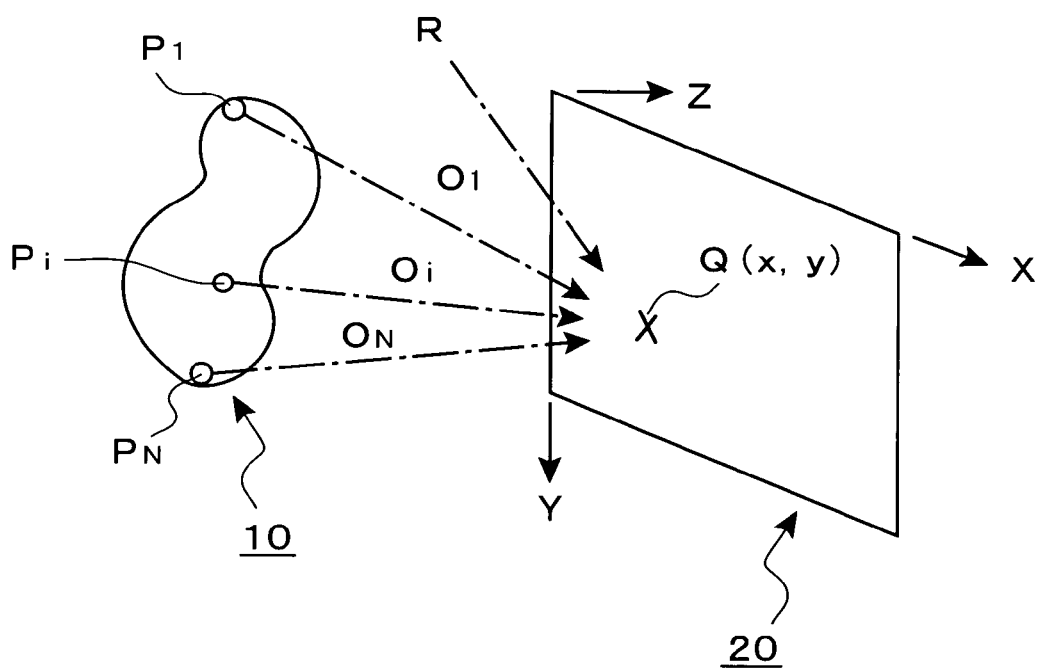
FIG. 2 is a diagram showing a method for calculating intensity of an interference wave at an arbitrary calculation point Q(x, y) on a recording surface.

In order to create a computer hologram at the position of the recording surface 20, the original image 10, recording surface 20, and reference light R are respectively defined as data on a computer, and interference wave intensities at respective positions on the recording surface 20 are calculated. Concretely, as shown in FIG. 2, the original image 10 is treated as an assembly of N point light sources P1, P2, P3, ..., Pi, ..., PN, it is provided that object lights O1, O2, O3, ..., Oi, ..., ON from the respective point light sources have respectively proceeded to a calculation point Q(x, y) and the reference light R has been irradiated toward the calculation point Q(x, y), and a calculation is carried out to determine amplitude intensity of an interference wave caused by an interference between these N object lights O1 to ON and reference light R at the point of the calculation point Q(x, y). The object lights and reference light are generally provided as monochromatic lights to carry out the calculation. On the recording surface 20, a large number of calculation points are defined at a predetermined pitch, and for each of the calculation points, amplitude intensity is calculated, whereby an intensity distribution of interference waves can be obtained on the recording surface 20.

By creating a physical shade pattern and embossed pattern on an actual medium based on image data indicating such an intensity distribution, a hologram for which the original image 10 has been recorded as interference fringes can be created. As a method for forming high-resolution interference fringes on a medium, drawing by use of an electron beam drawing apparatus is appropriate. The electron beam drawing apparatus has been widely used for purposes such as drawing a mask pattern of a semiconductor integrated circuit and has a function to scan electron beams with a high degree of accuracy. Therefore, by scanning electron beams after giving imaging data indicating an intensity distribution of interference waves determined by a calculation, an interference fringe pattern according to the intensity distribution can be drawn.

However, a general electron beam drawing apparatus merely has a function to draw a binary image by controlling drawing/not-drawing. Therefore, an intensity distribution determined by a calculation is binarized to create a binary image and the binary image data is given to the electron beam drawing apparatus.

Figure 3:
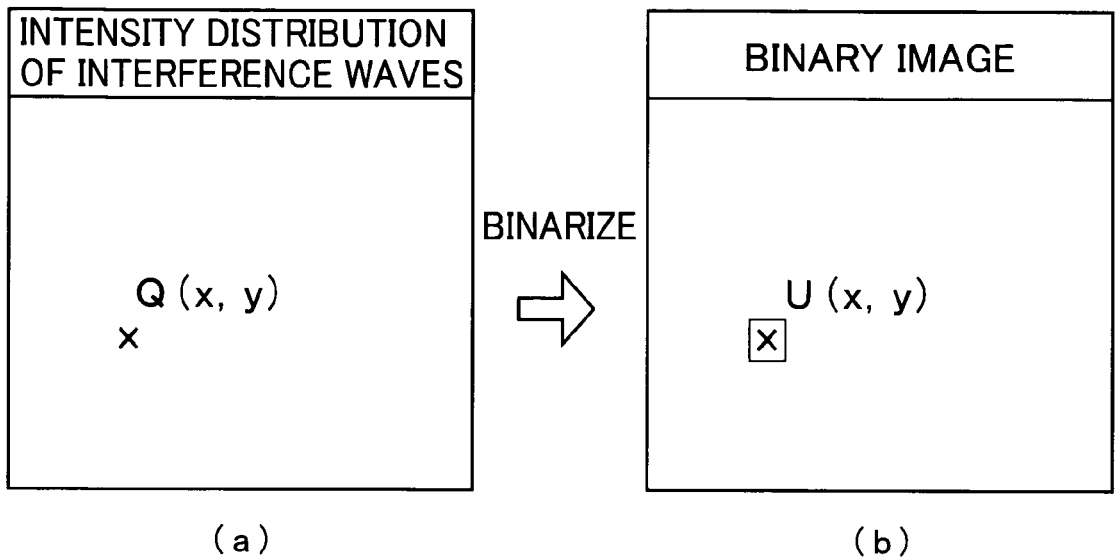
FIG. 3 is a conceptual diagram showing a process for obtaining a binary image based on an intensity distribution image of interference waves obtained by a calculation.

FIG. 3 is a conceptual diagram of a method for recording an interference fringe pattern by such a binarization process. By the above-described calculation, predetermined interference wave intensity values, that are, amplitude intensity values of interference waves are defined at the respective calculation points Q(x, y) on the recording surface 20. For example, at the calculation point Q(x, y) shown in FIG. 3(a) as well, a predetermined amplitude intensity value is defined. Therefore, for the amplitude intensity value, a predetermined threshold value (for example, a mean value of all amplitude intensity values distributed on the recording surface 20) is set, a pixel value "1" is given to a calculation point with an intensity value equal to or more than the threshold value, and a pixel value "0" is given to a calculation point with an intensity value less than the threshold value. Consequently, at the calculation point Q(x, y) shown in FIG. 3(a), either the pixel value "1" or "0" is defined. Therefore, as shown in FIG. 3(b), by defining a unit area U(x, y) at the position of the calculation point Q(x, y) and treating the unit area U(x, y) as a pixel with either the pixel value "1" or "0," a predetermined binary image can be obtained.

Figure 4:
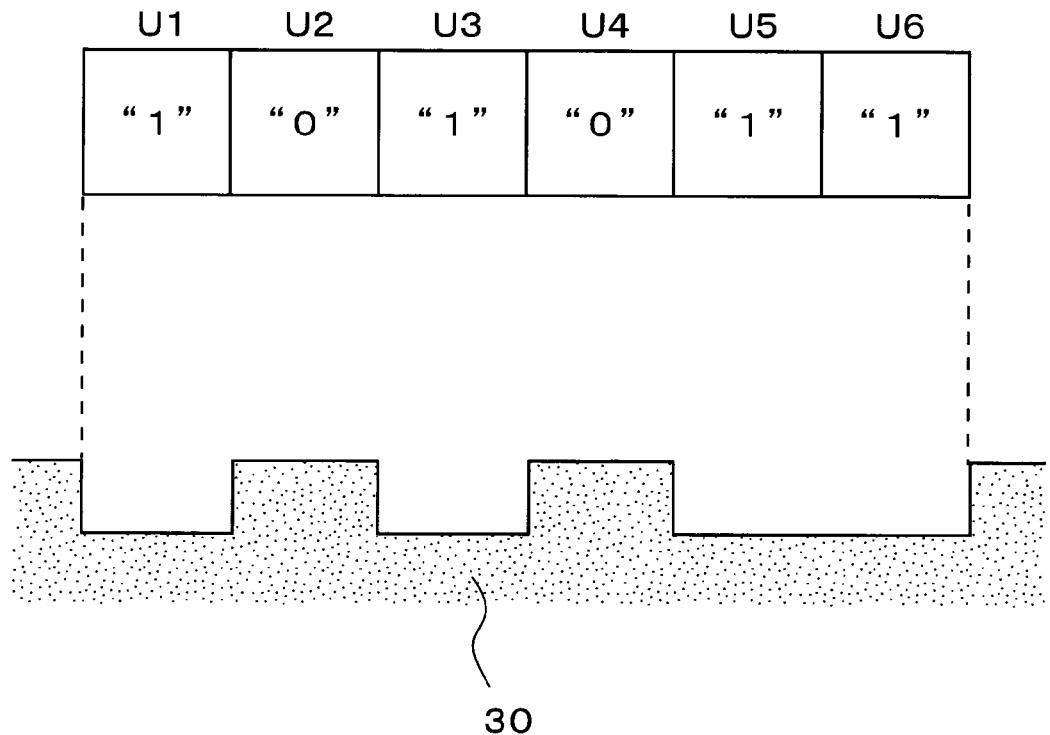
FIG. 4 is a plan view and sectional side view showing a condition where binary pixel values are defined in unit areas U1 to U6, respectively, and an embossed plate 30 having a convex and concave structure is created based on the pixel values.

By carrying out drawing after giving the binary image data to the electron beam drawing apparatus, interference fringes can be drawn as a physical binary image. In actuality, by, for example, creating an embossed plate based on the physically drawn interference fringes and carrying out an embossing process using the embossed plate, holograms on whose surfaces interference fringes have been formed as a convex and concave structure can be mass-produced. FIG. 4 shows an example in which, at six calculation points juxtaposed in the horizontal direction, unit areas U1 to U6 (pixels) are defined, respectively, so as to form a binary image and the embossed plate 30 (a sectional side view of which is shown in the drawing) is formed by use of the binary image. In the illustrated example, the unit areas U1, U3, U5, and U6 have pixel values "1," concave portions are formed at corresponding positions on the embossed plate 30, the unit areas U2 and U4 have pixel values "0," and convex portions are formed at corresponding positions on the embossed plate 30. By an embossing process using such an embossed plate 30, hologram recording media on which concavities and convexities are in an opposite relationship can be mass-produced.

Figures 5, 6:
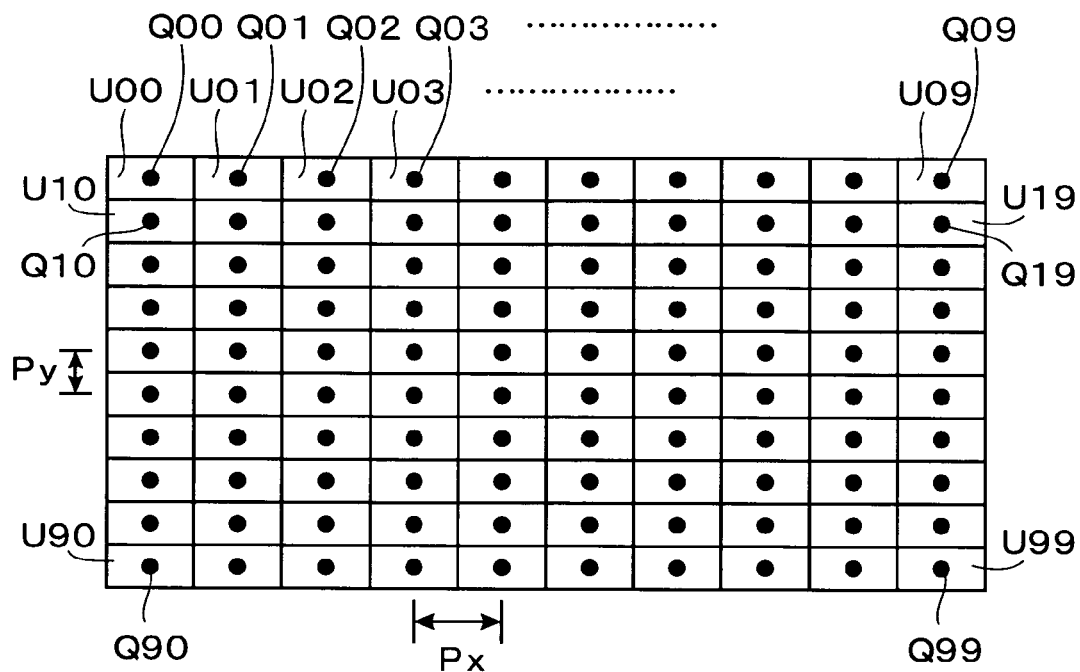
FIG. 5 is a plan view showing a condition where unit areas U00 to U99 are defined, respectively, at the position of calculation points Q00 to Q99 arrayed in a grid pattern on a recording surface 20.
FIG. 6 is a chart showing an example of interference wave intensity values determined in terms of 100 calculation points arranged on a 10×10 matrix.

In FIG. 4, for convenience of showing a relationship between the convex and concave structure on the embossed plate 30 and pixel values defined at the respective unit areas, a simple example in which the six unit areas U1 to U6 form a one-dimensional array has been shown, however, in actuality, the respective unit areas form a two-dimensional array on the recording surface 20. In FIG. 5, unit areas U00 to U99 that have been two-dimensionally arrayed in a form of ten lines and ten rows on the recording surface 20 are shown. In this example, all unit areas are rectangular regions that have been arranged, on the recording surfaces 20, so that a total of 100 calculation points Q00 to Q99 respectively arranged at a horizontal pitch of Px and a vertical pitch of Py are to be at center positions. The calculation points defined on the recording surface 20 serves a function as sampling points of interference wave intensity in a manner of speaking. Although, in the example shown in FIG. 5, the individual unit areas are arranged on the individual calculation points so that the center points of the rectangular unit areas are overlapped with the respective calculation points, the positional relationship between the unit areas and calculation points does not always necessarily have to be like this. For example, upper left corner points may be provided as reference points and the individual unit areas may be arranged so that the reference points in the upper left corners are overlapped with the calculation points.

As described above, for the respective calculation points Q00 to Q99 shown in FIG. 5, predetermined interference wave intensity values are respectively calculated. And, by the basic method herein described, the respective intensity values are binarized based on the predetermined threshold value and are converted to pixel values "1" or "0." Therefore, if, for example, unit areas U including calculation points Q at which the pixel value "1" has been defined are treated as white pixels and unit areas U including calculation points Q at which the pixel value "0" has been defined are treated as black pixels, a black and white binary image can be obtained. By forming a physical convex and concave structure for which white pixel parts are provided as convex portions, and black pixel parts, as concave portions (or vice versa) based on the binary image, a hologram medium can be obtained.

<<<Section 2. Computer Hologram Creation Method with Consideration of Grayscale Values>>>

Figures 7, 8:
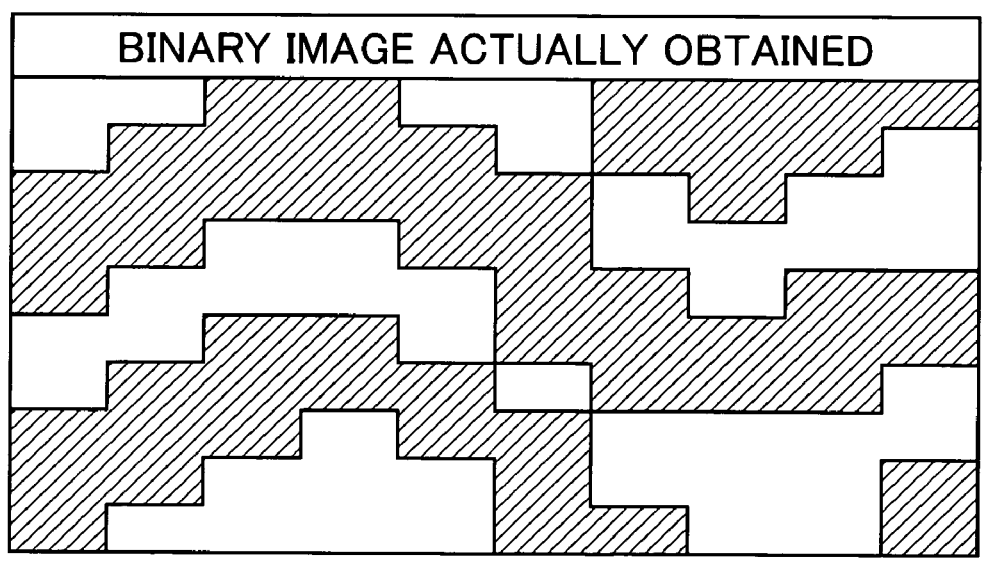
FIG. 7 is a chart showing a condition where the interference wave intensity values shown in FIG. 6 are binarized.
FIG. 8 is a plan view showing a binary image obtained based on the binarized data shown in FIG. 7.

In the above-described creation method of a computer hologram, since pixels allocated to the respective unit areas are limited to either the white pixels or black pixels, grayscale values of the interference wave intensities determined by a calculation are lost. For example, it is supposed that results as shown in FIG. 6 are obtained when, as shown in FIG. 5, 100 calculation points are defined with a two-dimensional array of ten lines and ten rows on the recording surface and the interference wave intensity values at the respective calculation points are determined as 7-level grayscale values of 0 to 6. According to the foregoing method, by binarizing such 7-level grayscale values as shown in FIG. 7 (for example, equal to 4 or more is provided as "1," and less than 4 is provided as "0") and allocating white pixels to "1" parts and to "1" parts, black pixels, a binary image as shown in FIG. 8 is created. When a hologram recording medium is created by forming a physical convex and concave structure on a medium by use of such a binary image, no sufficient grayscale expression is produced in a reproduced image obtained therefrom. This is because such a hologram recording medium is not recorded with grayscale values of interference wave intensity.

Therefore, in Japanese Unexamined Patent Publication No. 2000-214750 cited above, a method for recording grayscale values of interference wave intensity has been disclosed. According to the method, by preparing a plurality of pixels with grayscales in advance as pixels to be allocated to the respective unit areas and allocating pixels with specific grayscales according to the values of interference wave intensity, grayscale values of interference wave intensity are recorded. However, when carrying out physical drawing by an electron beam drawing apparatus or the like, it is necessary to provide the patterns to be allocated to the respective unit areas as binary patterns to the utmost. Therefore, in the method disclosed in Japanese Unexamined Patent Publication No. 2000-214750 cited above, a plurality of types of binary patterns each defined by dividing a unit area into a first area and a second area are prepared by changing an "occupancy ratio of the first area relative to the unit area" and, at the position of the respective calculation points, the binary patterns having occupancy ratios ("occupancy ratios of the first area relative to the unit area") corresponding to interference wave intensities in terms of the respective calculation points are allocated.

Figure 9:
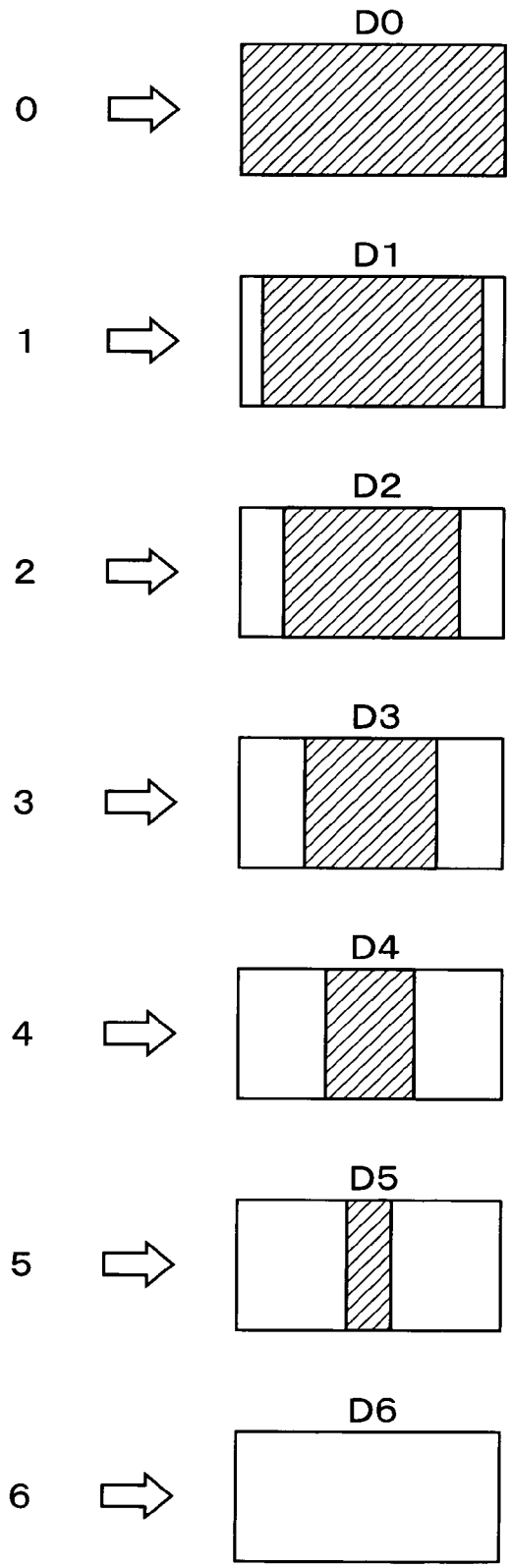
FIG. 9 is a plan view showing a configuration example of binary patterns used in the present invention.

This will be shown by a concrete example. For example, as shown in FIG. 9, seven types of binary patterns D0 to D6 are prepared in advance. All binary patterns are patterns in identical-sized rectangular unit areas and are each composed of a first area (hatching part in the drawing) having a first pixel value "1" and a second area (white part in the drawing) having a second pixel value "0." Although the binary pattern D0 includes only the first area and the binary pattern D6 includes only the second area, these are considered, for the sake of convenience, to be special cases where the other area is 0 in area. Here, when the "occupancy ratio of the first area (hatching part) relative to the unit area (whose rectangle)" is the focus of attention, the occupancy ratios with respect to the binary patterns D0, D1, D2, D3, D4, D5, and D6 are 6/6, 5/6, 4/6, 3/6, 2/6, 1/6, and 0/6, respectively.

In any binary pattern, as illustrated, the first area (hatching part) is composed of a rectangle having a vertical width equal to a vertical width of the unit area (whole rectangle) and having a horizontal width corresponding to a predetermined occupancy ratio, and moreover, the rectangle that composes the first area is arranged at a center position with respect to the horizontal width of the unit area. And, the remaining part other than where the first area is arranged in the unit area serves as the second area (white area).

Figure 10:
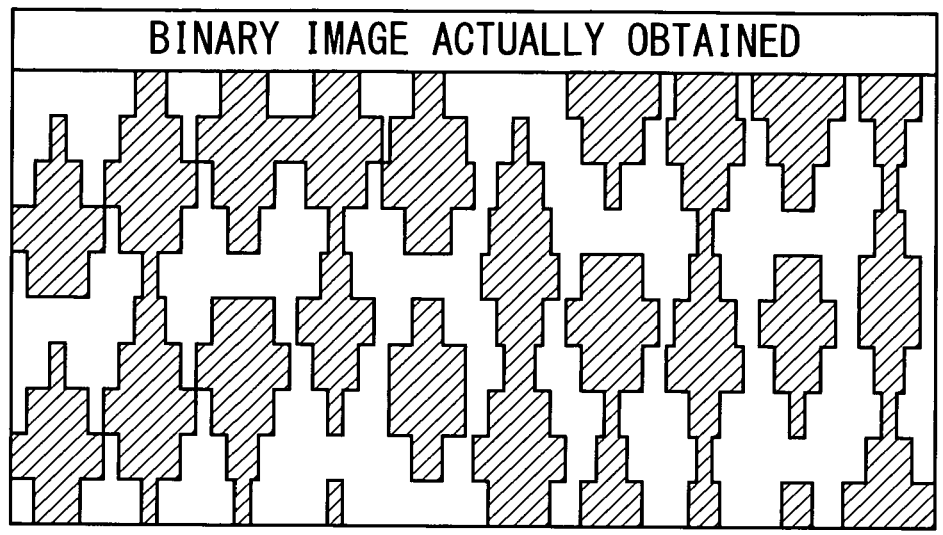
FIG. 10 is a plan view showing a binary image obtained by allocating any of the binary patterns shown in FIG. 9 in a manner corresponding to the interference wave intensity value data shown in FIG. 6.

Now, by selectively allocating the seven types of binary patterns D0 and D6 thus prepared to the position of the respective calculation points on the recording surface, it becomes possible to express interference wave intensity at the respective calculation points by 7-level grayscales. In the example shown in FIG. 6, the interference wave intensity at the respective calculation points is given as 7-level intensity values of 0 to 6. In order to allocate the seven types of binary patterns D0 to D6 to the 7-level intensity values, for example, as shown in FIG. 9, the binary patterns D0 to D6 are made to correspond to the intensity values 0 to 6, respectively (conversely, it may be possible to make the binary patterns D6 to D0 correspond to the intensity values 0 to 6, respectively). FIG. 10 is a view showing an example of binary images obtained by allocating binary patterns corresponding to the respective intensity values shown in FIG. 6. In comparison with the binary image shown in FIG. 8, it can be understood that the fact remains that both are binary images, but the interference wave intensity values are expressed while remaining with grayscale information.

When the binary image as shown in FIG. 10 has been obtained, by forming physical interference fringes on a medium based on the binary image, a computer hologram medium that is capable of reproducing an image with grayscales can be obtained. Concretely, an embossed structure for which the white part in FIG. 10 is provided as a convex portion and the hatching part is provided as a concave portion (or vise versa) is formed on the medium. In actuality, it is preferable that such a formation of the binary image is carried out by electron beam scanning using an electron beam drawing apparatus. As a matter of course, steps until the binary image as shown in FIG. 10 is obtained are carried out by a computer into which a predetermined program has been incorporated, and by giving binary image data created by the computer, an actual physical drawing process is carried out.

<<<Section 3. Reasons for Which Noise Component is Observed and Method for Eliminating the Same>>>

In the above, the concrete procedures for creating a hologram capable of reproducing an original image with grayscales by the method disclosed in Japanese Unexamined Patent Publication No. 2000-214750 cited above has been described. However, in actuality, in a computer hologram created by the method, a phenomenon that unnecessary noise components become overlapped in a reproduced image has occurred, and in comparison with a hologram created by an optical method, decline in reproduction quality of a grayscale image has been recognized. By investigating the reasons for which the noise components are observed, the present inventor could obtain the following theoretical analysis results.

Figure 11:
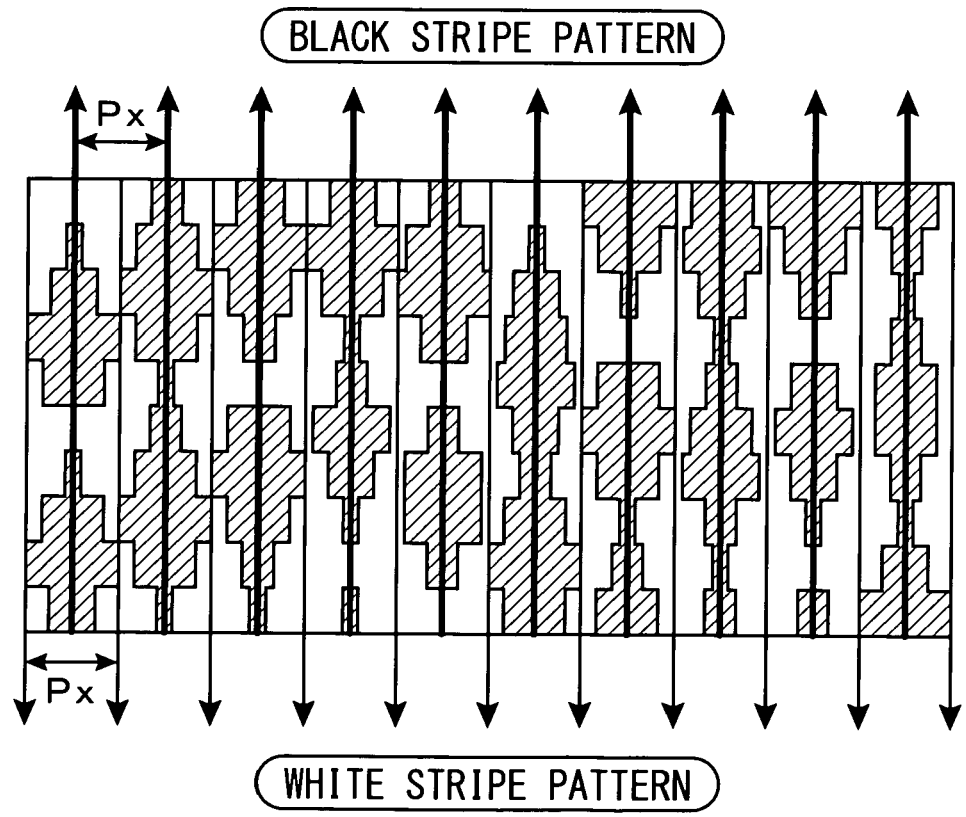
FIG. 11 is a plan view showing a periodic pattern that appears in the binary image shown in FIG. 10.
Figure 12:
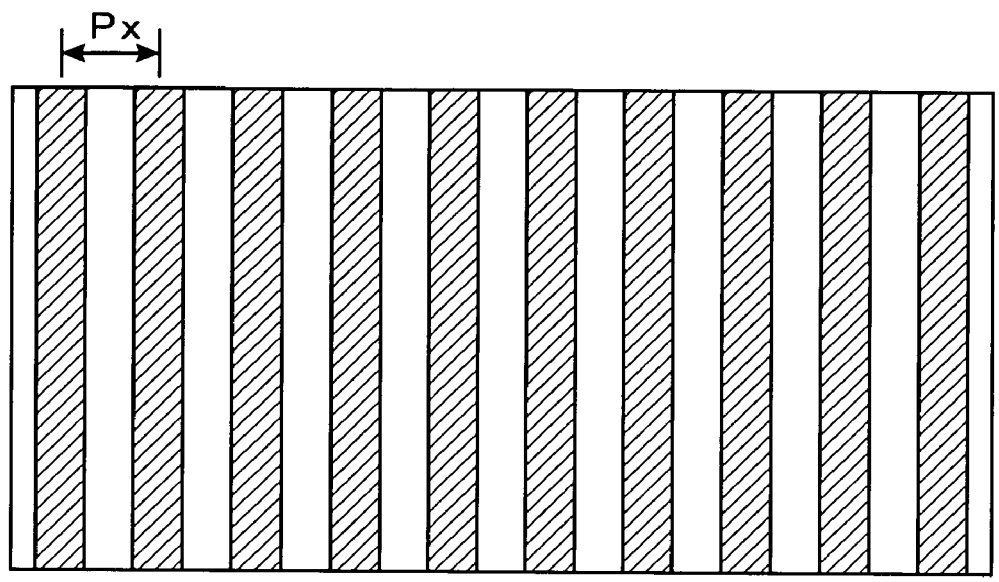
FIG. 12 is a plan view showing a diffraction grating pattern that serves a function equivalent to the periodic pattern shown in FIG. 11.

First, a hologram medium on which the binary image as shown in FIG. 10 has been expressed is observed by macroscopy. Then, as shown in FIG. 11, a condition where a black stripe pattern and a white stripe pattern that slenderly extend in the vertical direction are alternately overlapped with each other will be observed. Here, the horizontal period Px of the black stripe pattern and the horizontal period Px of the white stripe pattern are equal, and both are shifted by 180 degrees in phase. As a result, the binary image shown in FIG. 10 has optical properties approximate to those of the black and white stripe patterns as shown in FIG. 12 from a macroscopic perspective, and serves a function as a diffraction grating with the period Px. Here, the period Px is nothing but a horizontal pitch of the large number of calculation points Q defined on the recording surface 20.

When the binary image shown in FIG. 8 is compared with the binary image shown in FIG. 10, the former is an interference fringe pattern including no grayscale information on the original image 10, while the latter is an interference fringe pattern including grayscale information on the original image 10. However, since a method for expressing grayscale information as a pseudo binary image has been employed, the latter has a function as a diffraction grating with a period equal to the horizontal pitch Px of the calculation points Q. The reason that noise components look overlapped when the hologram medium on which the binary image as shown in FIG. 10 has been observed is because the hologram medium functions as a diffraction grating with the period Px and an unintended diffraction light is therefore mixed.

Figure 13:
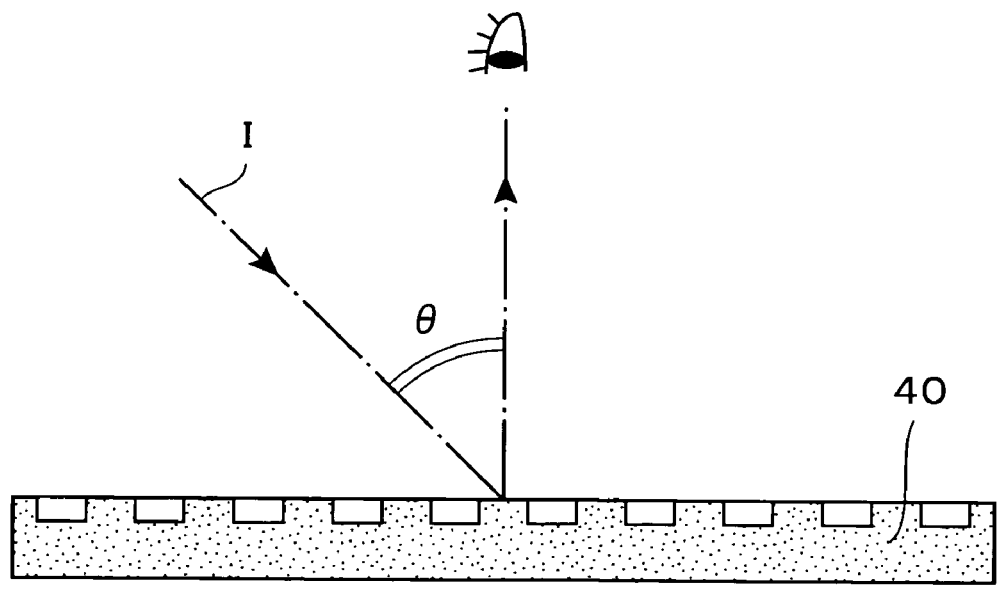
FIG. 13 is a sectional side view for explaining a phenomenon that a noise component is generated during observation of a hologram medium.

Particularly, in the lighting environment of the real world where a multiple of light sources exist, as a result of illuminating light being irradiated onto a medium to be an observation target from various directions, a reproduced image is observed in a condition mixed with a large number of noise components, and visibility cannot but decline in comparison with an optical hologram. Now, description will be given of a case where, for example, as shown in FIG. 13, a hologram medium 40 is observed from the normal direction on its recording surface. If the hologram medium 40 functions as a diffraction grating and an incident light I irradiated from a direction with an incident angle θ as in the drawing is diffracted in the normal direction, the diffraction light is observed as an unnecessary noise component.

Therefore, in order to make it possible to obtain a reproduced image as clear as possible by reducing unnecessary noise components as much as possible, it is sufficient to set a condition so as to prevent an unintended diffraction light from proceeding in an observing direction. The present inventor has considered such a condition on the following assumption.

First, provided is an assumption that the observing direction is, as in the example shown in FIG. 13, the normal direction on the recording surface of the hologram 40. As a matter of course, it is up to an observer from which direction the hologram medium 40 is observed, however, from a practical viewpoint, it is the most common case to observe the same from the normal direction, therefore, it is the most common method to create the hologram medium 40 on the assumption that this is observed from the normal direction.

Generally, a diffraction phenomenon by a diffraction grating is expressed by the following:

$$d(\sin\theta 1 - \sin\theta 2) = m\lambda$$

Here, d denotes a grating pitch of the diffraction grating, θ1 denotes an incident angle, θ2 denotes a diffraction angle, m denotes a diffraction order (m=1, 2, 3, . . . ) of a diffraction light, and λ is a wavelength of an incident light. Based on the above-described assumption, when it is considered that the hologram medium 40 is observed from the normal direction of the recording surface, it is sufficient that a condition that there is no diffraction light to have a diffraction angle θ2=0° (namely, a condition that no unintended diffraction light proceeds in the observing direction) is satisfied. Therefore, the condition to be determined is a condition on which an expression:

$$d(\sin\theta 1 - \sin 0) = m\lambda$$

does not hold true. Since sin 0=0, when the expression is adjusted, it takes such a form as:

$$\sin\theta 1 = m\lambda/d, \text{ and}$$

as a condition on which such an expression does not hold true, an expression:

$$1 < m\lambda/d$$

is derived (since $\sin\theta 1 \leq 1$ as long as θ1 is a real number, the above expression indicates a condition in which sin θ1>1, that is, a condition on which θ1 is an imaginary number). Here, if λ and d are constants, since the above expression is also satisfied with m=2, 3, . . . as well when the above expression is satisfied with m=1, it is sufficient to consider the case of m=1. Therefore, the condition to be determined is expressed by a simple expression:

$$d < \lambda.$$

Here, as a small study on a critical condition, with d=λ, when the incident light I comes from a direction (θ1=90°) parallel to the recording surface, the diffraction light is to indicate a state (diffraction angle θ2=0°) where the same proceeds in the normal direction. However, in consideration of the physical structure (physical three-dimensional convex and concave structure) of the hologram medium 40, it is impossible that light made incident from a direction parallel to the recording surface is diffracted in the normal direction. Therefore, in actuality, the above expression may be expressed with the inclusion of an equal sign as follows:

$$d \leq \lambda.$$

In the above, a study has been made on the cases where the diffraction order m is a positive integer 1, 2, 3, . . . . Here, to make it doubly sure, a study will be made on a case where the diffraction order m is 0 and cases where the diffraction order is a negative integer −1, −2, −3, . . . as well. First, with m=0, this is a special case where the incident light itself reaches an observer's eye, and no consideration is necessary in reality. For example, with a reflective hologram, in order to make a 0-order diffraction light reach an observer's eye, it is necessary to irradiate the incident light from the direction of an observer's eye, and this is an unlikely lighting environment in reality. On the other hand, with regard to the cases where m becomes a negative integer −1, −2, −3, since these are included in the contents of the foregoing study when treated as cases where the sign of the incident angle θ1 has been inverted, it is unnecessary to separately study the cases where m becomes negative. For example, since the case of m=−1 and θ1=30° is equivalent to the case of m=1 and θ1=−30° where the respective signs have been inverted, a new study is unnecessary.

Meanwhile, here, although λ denotes a wavelength of the incident light, a lighting environment when the hologram medium 40 is observed includes light with various wavelengths in actuality. However, light that exerts an influence on the observer's eye as a noise component is limited to a visible light to a human eye. Consequently, the above expression $d \leq \lambda$ is satisfied as long as the grating pitch d of the diffraction grating has been set equal to or less than the shortest wavelength of a visible light, and even when light with any wavelength in the visible range is made incident into the recording surface of the hologram medium 40 from any direction, the incident light is never diffracted in the normal direction (observing direction).

Consequently, in FIG. 5, as long as the horizontal pitch Px of the calculation points Q has been set equal to or less than the shortest wavelength of a visible light, even when the binary image as shown in FIG. 10 indicates an unintended characteristic as a diffraction grating, the grating pitch d of the diffraction grating always satisfies the condition $d \leq \lambda$ relative to the wavelength λ of the visible light, so that a noise component made of the visible light is never visible to the eye of the observer who observes from the normal direction.

In an embodiment disclosed in Japanese Unexamined Patent Publication No. 2000-214750 cited above, an example of setting the horizontal pitch Px of the calculation points Q to approximately 600 nm is shown. The calculation point pitch being 600 nm is a numerical value sufficiently fine to give a resolution to faithfully reproduce the original image 10. However, based on the above-described theoretical consideration, it can be understood that since the hologram medium obtained while setting the calculation point pitch Px to 600 nm has a characteristic as a diffraction grating with a grating pitch of d=600 nm, an unnecessary diffraction light reaches an observer's eye. When a hologram medium created by the method disclosed in Japanese Unexamined Patent Publication No. 2000-214750 is observed, the reason that decline in reproducing quality has been recognized due to overlapping noise components exists exactly at this point.

In order to eliminate the reason that the noise components are observed, the horizontal pitch Px of the calculation points Q is set equal to or less than the shortest wavelength of a visible light. Generally, it has been known that human relative luminosity considerably declines in a short wavelength range, and as the shortest wavelength of a visible light when carrying out the invention as claimed in the present application, it is appropriate to use a wavelength value of 400 nm. Namely, in FIG. 5, by setting the horizontal pitch Px of the calculation points Q equal to or less than 400 nm, a hologram medium that is capable of reproducing a clear image without receiving influence of noise components can be created.

<<<Section 4. Configuration Example of Binary Patterns to be Prepared>>>

Figure 14:
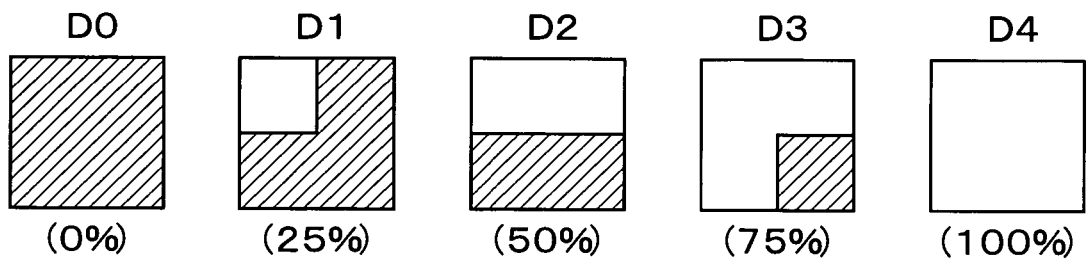
FIG. 14 is a plan view showing a first variation of the binary pattern configuration example shown in FIG. 9.
Figure 15:
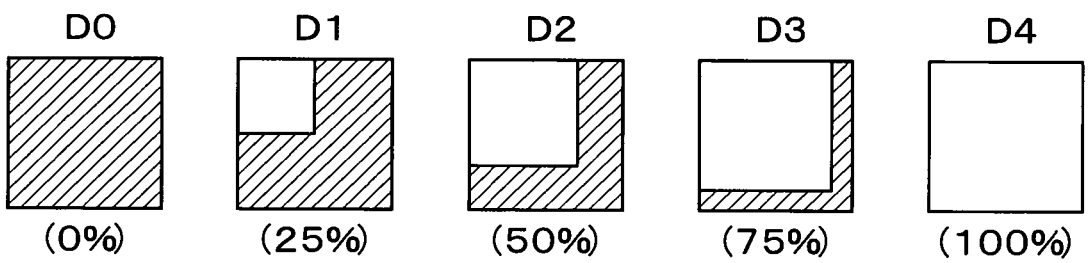
FIG. 15 is a plan view showing a second variation of the binary pattern configuration example shown in FIG. 9.
Figure 16:
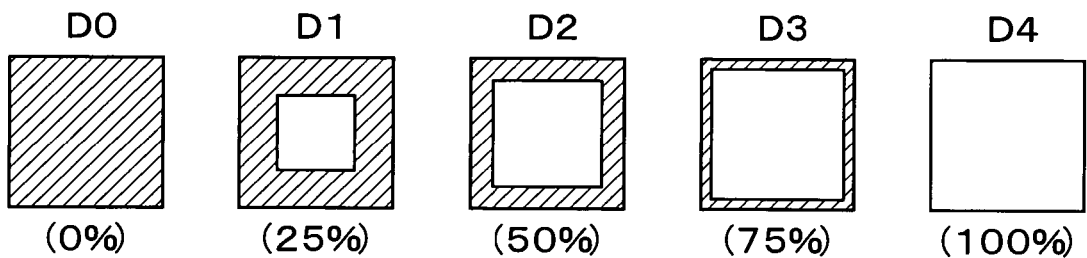
FIG. 16 is a plan view showing a third variation of the binary pattern configuration example shown in FIG. 9.

FIG. 9 shows a configuration example of seven types of binary patterns D0 to D6 that are available in the present invention. Here, with reference to FIG. 14 to FIG. 16, some variations of the binary patterns will be shown. Configuration examples of the binary patterns shown in FIG. 14 to FIG. 16 are all binary pattern groups each defined by dividing a rectangular parallelepiped unit area into a first area (white part) having a first pixel value and a second area (part applied with hatching) having a second pixel value, and are almost the same in this point as the configuration of the binary patterns shown in FIG. 9 (for convenience of illustration, the first area is shown as a hatching part in FIG. 9, while in FIG. 14 to FIG. 16, the first area is shown as a white part.) In these binary patterns, the occupancy ratios of the first area relative to the whole unit area are D0:0%, D1:25%, D2:50%, D3:75%, and D4:100%.

Since a binary image created by use of the binary patterns shown in FIG. 9 has, as already described, periodicity in the horizontal direction, a characteristic as a diffraction grating as shown in FIG. 12 is exhibited. In contrast thereto, when the binary patterns shown in FIG. 14 to FIG. 16 are used, since binary images have periodicity not only in the horizontal direction but also in the vertical direction, a characteristic as a diffraction grating is exhibited not only in the horizontal direction but also in the vertical direction. Therefore, when the binary patterns shown in FIG. 14 to FIG. 16 are used, it is necessary to set not only the horizontal pitch Px of the calculation points Q but also the vertical pitch Py equal to or less than the shortest wavelength (equal to or less than 400 nm) of the visible light.

Of course, for practical use, it is most preferable to use the binary patterns as shown in FIG. 9. In the binary patterns shown in FIG. 9, although the form of the first area changes, the center position thereof is always equal to a center position of the whole unit area, and a side of the rectangle is always integral multiples of a predetermined unit size, therefore, a drawing process by an electron beam drawing apparatus can also be easily carried out. The configuration example of binary patterns shown in FIG. 9 is generalized as follows. That is, rectangles are used as unit areas and binary patterns are formed by arranging the first areas (hatching parts) formed of rectangles having vertical widths equal to the vertical width of the unit areas and having horizontal widths according to predetermined occupancy ratios (6/6, 5/6, 4/6, 3/6, 2/6, 1/6, and 0/6) at center positions with respect to the horizontal width of the unit areas and providing remaining parts as the second areas (white parts).

Figure 17:
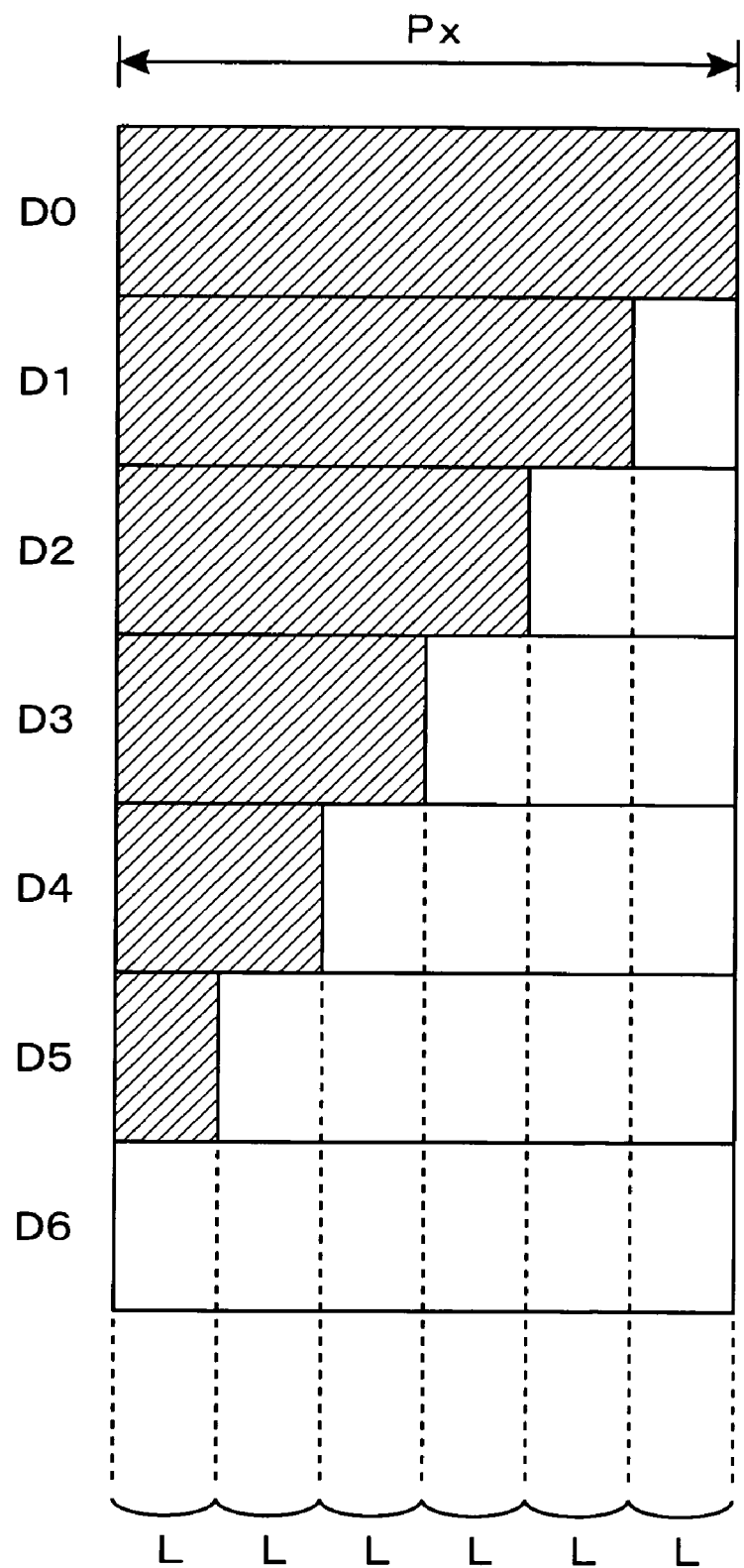
FIG. 17 is a plan view showing the size of the binary pattern configuration example shown in FIG. 9, by comparison.

When forming such seven types of binary patterns on a physical medium by beam scanning using an electron beam drawing apparatus, a predetermined unit size L is provided, and drawing is carried out in a unit of integral multiples of the unit size L. FIG. 17 is a plan view showing the size of the binary pattern configuration example shown in FIG. 9, by comparison, in which the hatching parts of the respective binary patterns shown in FIG. 9 are shown by comparison with the left ends aligned. It can be understood that the size in the horizontal direction of the hatching parts changes in steps of integral multiples of the unit size L. Since the horizontal width sizes of the rectangles forming the first areas are all integral multiples of the unit size L, a drawing process is remarkably simplified.

In general, a very rational operation is enabled by setting the horizontal width size of the rectangles forming the unit areas so as to be n times as great as the unit size L (n is an integer: in the illustrated example, n=6), preparing (n+1) types binary patterns such as to have the horizontal width sizes of the rectangles forming the first areas 0 times, 1 time, 2 times, . . . n times as great as the unit size, and allocating these binary patterns to interference wave intensities sectioned in (n+1) levels in a corresponding manner, respectively. In this case, the horizontal pitch of the calculation points Q is set so as to be Px=L×n.

The unit size L cannot be reduced further than a minimum drawing size h determined based on drawing resolution of the drawing apparatus. Therefore, when the binary pattern configuration shown in FIG. 9 is used, the lower limit of the horizontal pitch of the calculation points Q is Px=h×n. Currently, since the spot diameter of an electron beam of a generally used electron beam drawing apparatus is approximately 50 nm and scanning accuracy thereof is approximately 10 nm, the minimum drawing size h is 10 nm at the present moment. Therefore, when the binary pattern configuration example shown in FIG. 9 is used, the horizontal pitch of the calculation points Q is set within a range equal to or less than 400 nm and equal to or more than 60 nm.

<<<Section 5. Application to Method Using No Reference Light>>>

The embodiment described so far has employed a method for calculating intensity of an interference wave between the object light and reference light at each of the respective calculation points Q defined on the recording surface 20, as shown in FIG. 2, however, a method using no reference light also exists in the calculation methods of computer holograms. For example, Japanese Unexamined Patent Publication No. 2002-72837 has disclosed a method for a hologram by recording an interference wave only by an object light without defining a reference light. According to the method, for each individual calculation point, amplitude intensity and a phase of an interference wave are calculated, at the position of the respective calculation points, three-dimensional cells with two-dimensional binary patterns having occupancy ratios corresponding to interference wave intensities in terms of the respective calculation points, respectively, and three-dimensional structures capable of phase modulations corresponding to interference wave phases in terms of the respective calculation points, respectively, are allocated, whereby a physical hologram medium formed from an assembly of the three-dimensional cells allocated on a recording surface is created.

Figure 18:
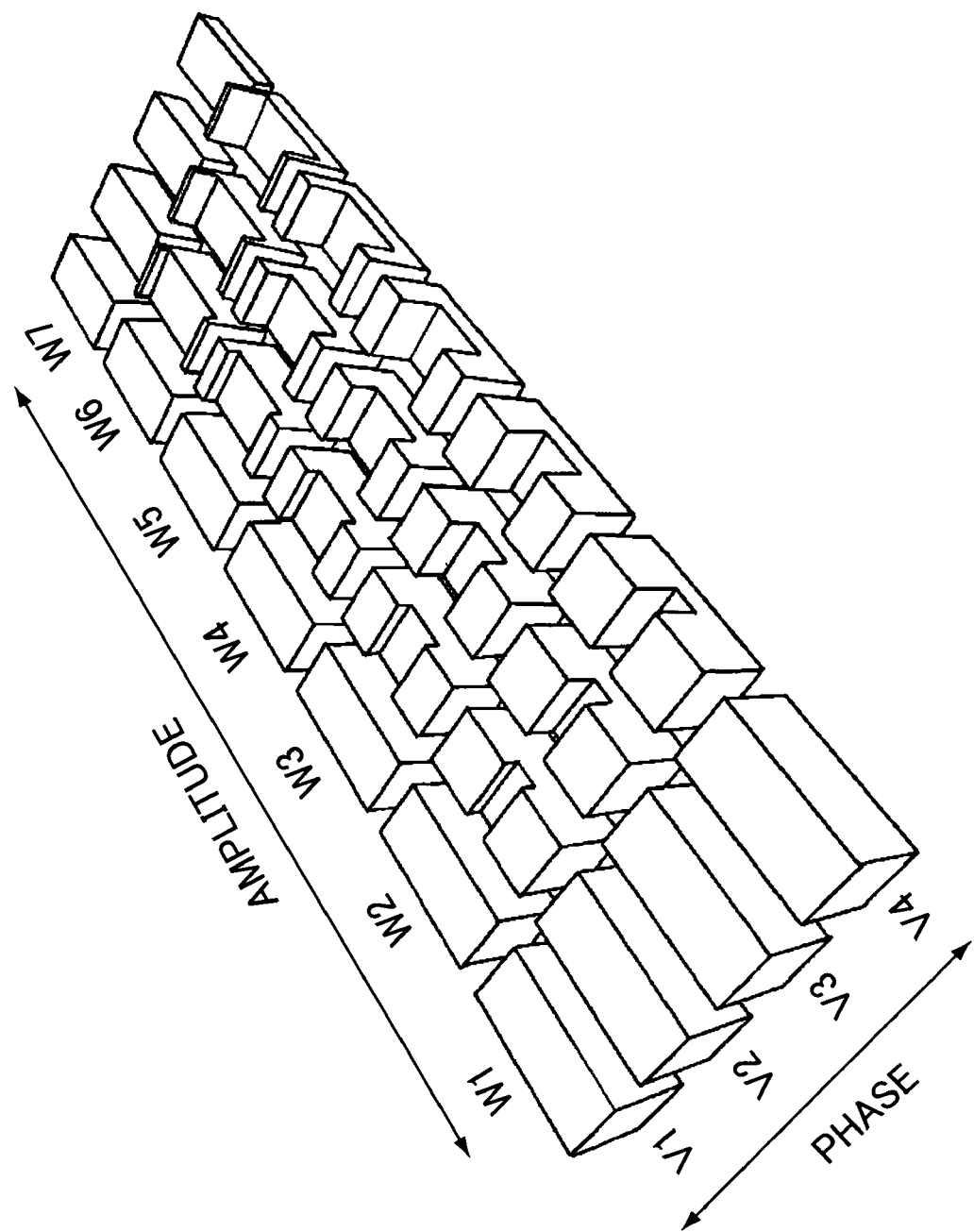
FIG. 18 is a perspective view showing an assembly example of three-dimensional cells used to carry out the present invention.

FIG. 18 is a perspective view showing an example of three-dimensional cells used for such a method. For each three-dimensional cell, a concave groove is provided at a central part, a base area of the concave groove corresponds to amplitude determined at each calculation point, and a depth corresponds to a phase. Since a principle and a concrete method for creating a hologram medium by use of such three-dimensional cells have been described in detail in the above-mentioned Japanese Unexamined Patent Publication No. 2002-72837, a detailed description thereof will be omitted here. However, a creation method of a computer hologram according to the present invention is also applicable to such a method using three-dimensional cells as well. Namely, according to the method using three-dimensional cells, a predetermined three-dimensional cell is to be arranged at each calculation point in a manner corresponding to amplitude and a phase value determined in terms of the calculation point. In such a method, by setting the pitch of calculation points equal to or less than a minimum wavelength of the visible light, it becomes possible to create a hologram medium capable of reproducing a clear image without noise components.

INDUSTRIAL APPLICABILITY

The present invention is widely applicable to usage for creating holograms by use of computers. In particular, by the method according to the present invention, since a hologram capable of obtaining a clear image by reducing unnecessary noise components can be created, the method is optimal for applications for creating anticounterfeit holograms used for exchange tickets for money and credit cards.

The invention claimed is:

1. A method for creating a computer hologram, which is supposed to be observed in a lighting environment of the real world where a multiple of light sources exist, by forming interference fringes on a predetermined recording surface by a computer-aided operation, said method comprising the steps of:

defining a predetermined original image in a three-dimensional coordinate system, a recording surface placed in the coordinate system for recording the original image, and a reference light to be irradiated onto the recording surface;

defining a large number of calculation points on the recording surface, and calculating, in terms of the individual calculation points, intensity of an interference wave formed by an object light emitted from a light source defined on the original image and the reference light;

defining a plurality of types of binary patterns each defined by dividing a unit area having a fixed form and size into a first area having a first pixel value and a second area having a second pixel value by changing an occupancy ratio of the first area relative to the unit area;

allocating, at positions of the respective calculation points, binary patterns having occupancy ratios corresponding to interference wave intensities in terms of the respective calculation points, respectively; and creating physical fringes on a medium based on a binary image formed from an assembly of the binary patterns allocated onto the recording surfacer, wherein a rectangle is used as the unit area, and the binary pattern is formed by arranging the first area formed of a rectangle having a vertical width equal to a vertical width of the unit area and having a horizontal width according to a predetermined occupancy ratio at an approximately center position with respect to a horizontal width of the unit area and providing a remaining part as the second area, and wherein a horizontal pitch of the calculation points defined on the recording surface is set equal to or less than a minimum wavelength of a visible light.

2. The method for creating a computer hologram according to claim 1, wherein physical binary patterns are formed by beam scanning using a drawing apparatus with a predetermined resolution, horizontal width sizes of the rectangles forming the first areas of the individual binary patterns are set to be integral multiples of a predetermined unit size L provided in advance within a range where drawing by the drawing apparatus is possible.

3. The method for creating a computer hologram according to claim 2, wherein the horizontal width sizes of the rectangles forming the unit areas are set so as to be n times as great as the unit size L (n is an integer), (n+1) types of binary patterns such as to have horizontal width sizes of the rectangles forming the first areas 0 times, 1 time, 2 times, . . . . n times as great as the unit size are prepared, and the binary patterns are allocated to interference wave intensities sectioned in (n+1) levels in a corresponding manner, respectively, and where a minimum drawing size determined based on drawing resolution of the drawing apparatus is provided as h, a horizontal pitch of the calculation points is set so as to be equal to or less than the minimum wavelength of a visible light and equal to or more than h×n.

4. The method for creating a computer hologram according to claim 1,
wherein rectangles each having a vertical width equal to a vertical pitch of the calculation points and a horizontal width equal to a horizontal pitch of the calculation points are used as the unit areas, reference points common to all the unit areas are provided, the individual binary patterns are allocated so that the respective reference points are arranged on the respective calculation points so that the binary patterns are allocated across an entire surface of the recording surface, and the vertical pitch and the horizontal pitch of the calculation points are both set so as to be equal to or less than the minimum wavelength of a visible light.

5. The method for creating a computer hologram according to claim 1,
wherein the minimum wavelength of a visible light is provided as 400 nm.

6. A computer-readable storage medium storing a program to make a computer execute processes until a creating step of a binary image in the method for creating a computer hologram according to claim 1.

7. A computer hologram medium on which a computer hologram created by the method according to claim 1 is recorded.

8. A method for creating a computer hologram which is supposed to be observed in a lighting environment of the real world where a multiple of light sources exist, by forming interference fringes on a predetermined recording surface by a computer-aided operation, said method comprises the steps of:
defining a predetermined original image in a three-dimensional coordinate system, and a recording surface placed in said coordinate system for recording the original image;
defining a large number of calculation points on the recording surface, and calculating, in terms of the individual calculation points, intensity and phase of an interference wave formed by an object light emitted from a light source defined on the original image;
defining a plurality of types of binary patterns each defined by dividing a unit area having a fixed form and size into a first area having a first pixel value and a second area having a second pixel value by changing an occupancy ratio of the first area relative to the unit area;
allocating, at positions of the respective calculation points, three-dimensional cells with the two-dimensional binary patterns having occupancy ratios corresponding to interference wave intensities in terms of the respective calculation points, respectively, and three-dimensional structures capable of phase modulations corresponding to interference wave phases in terms of the respective calculation points, respectively; and
creating a physical hologram recording medium formed from an assembly of the three-dimensional cells allocated onto the recording surface,
wherein a rectangle is used as the unit area, and the binary pattern is formed by arranging the first area formed of a rectangle having a vertical width equal to a vertical width of the unit area and having a horizontal width according to a predetermined occupancy ratio at an approximately center position with respect to a horizontal width of the unit area and providing a remaining part as the second area, and
wherein a horizontal pitch of the calculation points defined on the recording surface is set equal to or less than a minimum wavelength of a visible light.

9. The method for creating a computer hologram according to claim 8,
wherein physical binary patterns are formed by beam scanning using a drawing apparatus with a predetermined resolution, horizontal width sizes of the rectangles forming the first areas of the individual binary patterns are set to be integral multiples of a predetermined unit size L provided in advance within a range where drawing by the drawing apparatus is possible.

10. The method for creating a computer hologram according to claim 9,
wherein the horizontal width sizes of the rectangles forming the unit areas are set so as to be n times as great as the unit size L (n is an integer), (n+1) types of binary patterns such as to have horizontal width sizes of the rectangles forming the first areas 0 times, 1 time, 2 times, . . . n times as great as the unit size are prepared, and the binary patterns are allocated to interference wave intensities sectioned in (n+1) levels in a corresponding manner, respectively, and where a minimum drawing size determined based on drawing resolution of the drawing apparatus is provided as h, a horizontal pitch of the calculation points is set so as to be equal to or less than the minimum wavelength of a visible light and equal to or more than h×n.

11. The method for creating a computer hologram according to claim 8,
wherein rectangles each having a vertical width equal to a vertical pitch of the calculation points and a horizontal width equal to a horizontal pitch of the calculation points are used as the unit areas, reference points common to all the unit areas are provided, the individual binary patterns are allocated so that the respective reference points are arranged on the respective calculation points so that the binary patterns are allocated across an entire surface of the recording surface, and the vertical pitch and the horizontal pitch of the calculation points are both set so as to be equal to or less than the minimum wavelength of a visible light.

12. The method for creating a computer hologram according to claim 8,
wherein the minimum wavelength of a visible light is provided as 400 nm.

13. A computer-readable storage medium storing a program to make a computer execute processes until a creating step of a binary image in the method for creating a computer hologram according to claim 8.

14. A computer hologram medium on which a computer hologram created by the method according to claim 8 is recorded.

15. A computer hologram medium which is supposed to be observed in a lighting environment of the real world where a multiple of light sources exist, on the medium a three-dimensional original image being recorded as interference fringes that form a convex and concave structure,
wherein a large number of unit areas are defined on the medium, the respective unit areas on the medium are each divided into a first area and a second area, the first area and the second area have a relationship that one forms a convex portion, and the other, a concave portion, interference wave intensity at a position of each unit area is expressed by an occupancy ratio of the first area relative to the unit area, and the respective unit areas are arrayed horizontally and vertically so as to form a two-dimensional array on the medium, and
wherein both of a horizontal pitch and a vertical pitch of the unit areas are set equal to or less than 400 nm.

16. A method for creating a computer hologram which is supposed to be observed in a lighting environment of the real world where a multiple of light sources exist, by forming interference fringes on a predetermined recording surface by a computer-aided operation, said method comprising the steps of:

defining a predetermined original image in a three-dimensional coordinate system, a recording surface placed in said coordinate system for recording the original image, and a reference light to be irradiated onto the recording surface;

defining a large number of calculation points on the recording surface arrayed horizontally and vertically so as to form a two-dimensional array, and calculating, in terms of the individual calculation points, intensity of an interference wave formed by an object light emitted from a light source defined on the original image and the reference light;

defining a plurality of types of binary patterns each defined by dividing a unit area having a fixed form and size into a first area having a first pixel value and a second area having a second pixel Value by changing an occupancy ratio of the first area relative to the unit area;

allocating, at positions of the respective calculation points, binary patterns having occupancy ratios corresponding to interference wave intensities in terms of the respective calculation points, respectively; and creating physical fringes on a medium based on a binary image formed from an assembly of the binary patterns allocated onto the recording surface, wherein both of a horizontal pitch and a vertical pitch of the calculation points defined on the recording surface are set equal to or less than a minimum wavelength of a visible light.

17. The method for creating a computer hologram according to claim 16, wherein the minimum wavelength of a visible light is provided as 400 nm.

18. A computer-readable storage medium storing a program to make a computer execute processes until a creating step of a binary image in the method for creating a computer hologram according to claim 16.

19. A computer hologram medium on which a computer hologram created by the method according to claim 16 is recorded.

20. A method for creating a computer hologram which is supposed to be observed in a lighting environment of the real world where a multiple of light sources exist, by forming interference fringes on a predetermined recording surface by a computer-aided operation, said method comprising the steps of:

defining a predetermined original image in a three-dimensional coordinate system, and a recording surface placed in said coordinate system for recording the original image;

defining a large number of calculation points on the recording surface arrayed horizontally and vertically so as to form a two-dimensional array, and calculating, in terms of the individual calculation points, intensity and phase of an interference wave formed by an object light emitted from a light source defined on the original image;

defining a plurality of types of binary patterns each defined by dividing a unit area having a fixed form and size into a first area having a first pixel value and a second area having a second pixel value by changing an occupancy ratio of the first area relative to the unit area;

allocating, at positions of the respective calculation points, three-dimensional cells with the two-dimensional binary patterns having occupancy ratios corresponding to interference wave intensities in terms of the respective calculation points, respectively, and three-dimensional structures capable of phase modulations corresponding to interference wave phases in terms of the respective calculation points, respectively; and creating a physical hologram recording medium formed from an assembly of the three-dimensional cells allocated onto the recording surface;

wherein both of a horizontal pitch and a vertical pitch of the calculation points defined on the recording surface are set equal to or less than a minimum wavelength of a visible light.

21. The method for creating a computer hologram according to claim 20, wherein the minimum wavelength of a visible light is provided as 400 nm.

22. A computer-readable storage medium storing a program to make a computer execute processes until a creating step of a binary image in the method for creating a computer hologram according to claim 20.

23. A computer hologram medium on which a computer hologram created by the method according to claim 20 is recorded.

* * * * *

UNITED STATES PATENT AND TRADEMARK OFFICE
CERTIFICATE OF CORRECTION

PATENT NO. : 7,573,622 B2
APPLICATION NO. : 10/586705
DATED : August 11, 2009
INVENTOR(S) : Mitsuru Kitamura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 281 days.

Signed and Sealed this

Seventh Day of September, 2010

David J. Kappos
*Director of the United States Patent and Trademark Office*